March 24, 1931.  C. S. WEYANDT  1,797,253
RECIPROCATING MOTOR
Filed July 9, 1927   4 Sheets-Sheet 1

INVENTOR
Carl S. Weyandt
BY Cornelius D. Ehret
his ATTORNEY

March 24, 1931.　　　C. S. WEYANDT　　　1,797,253
RECIPROCATING MOTOR
Filed July 9, 1927　　　4 Sheets-Sheet 3

INVENTOR
Carl S. Weyandt
BY Cornelius D. Ehret
his ATTORNEY

March 24, 1931. C. S. WEYANDT 1,797,253
RECIPROCATING MOTOR
Filed July 9, 1927 4 Sheets-Sheet 4

INVENTOR
Carl S. Weyandt
BY Cornelius D. Ehret
his ATTORNEY

Patented Mar. 24, 1931

1,797,253

UNITED STATES PATENT OFFICE

CARL S. WEYANDT, OF PITTSBURGH, PENNSYLVANIA

RECIPROCATING MOTOR

Application filed July 9, 1927. Serial No. 204,510.

My invention relates to reciprocating electric motors or hammers, and to systems for cooling and controlling the same, the motors or hammers being utilizable for any suitable purpose and particularly as percussive tools for drilling, cutting, chipping, riveting or otherwise working metal, stone, concrete and the like, and for tamping railway ballast or ties, earth and other materials.

In accordance with my invention the electric reciprocating motor or hammer is constructed and its parts arranged to afford passages, including ducts outside of and within the winding or windings, through which a cooling medium, as air or equivalent, is passed.

Further in accordance with my invention, a portable reciprocating motor is comprised in a system with a portable power plant comprising a source of current and a pump for cooling medium; and more particularly the system may comprise also a portable control box, intervening between the power plant and reciprocating motor, in which may be disposed the pump with its driving motor and such other and further devices as may be desired.

Further in accordance with my invention there is provided a pump for cooling medium driven by an electric motor which is controlled either by a switch upon the reciprocating motor or hammer for causing operation of the pump only when the hammer is in operation, or by a separate switch whereby the pump may be continuously driven.

Further in accordance with my invention there is provided a control unit or box in which are disposed the electric valve structure and the blower or air pump and its driving motor and upon which is mounted one element of an electric and air coupling which constitutes a terminal of an air hose with which are associated conductors extending to the reciprocating motor.

Further in accordance with my invention, the pole tips of the magnetic field members are hardened and ground flush with the supporting member or barrel and come into direct magnetic contact with the reciprocating core member which bears upon them.

My invention resides in a system, features of construction, arrangement and combinations thereinafter described and claimed.

This application is in part a continuation of my application Serial No. 708,209, filed April 22, 1924.

For an illustration of one of the various forms my invention may take, reference is to be had to the accompanying drawings, in which.

Figures 1, 2, 3, 4, 5:
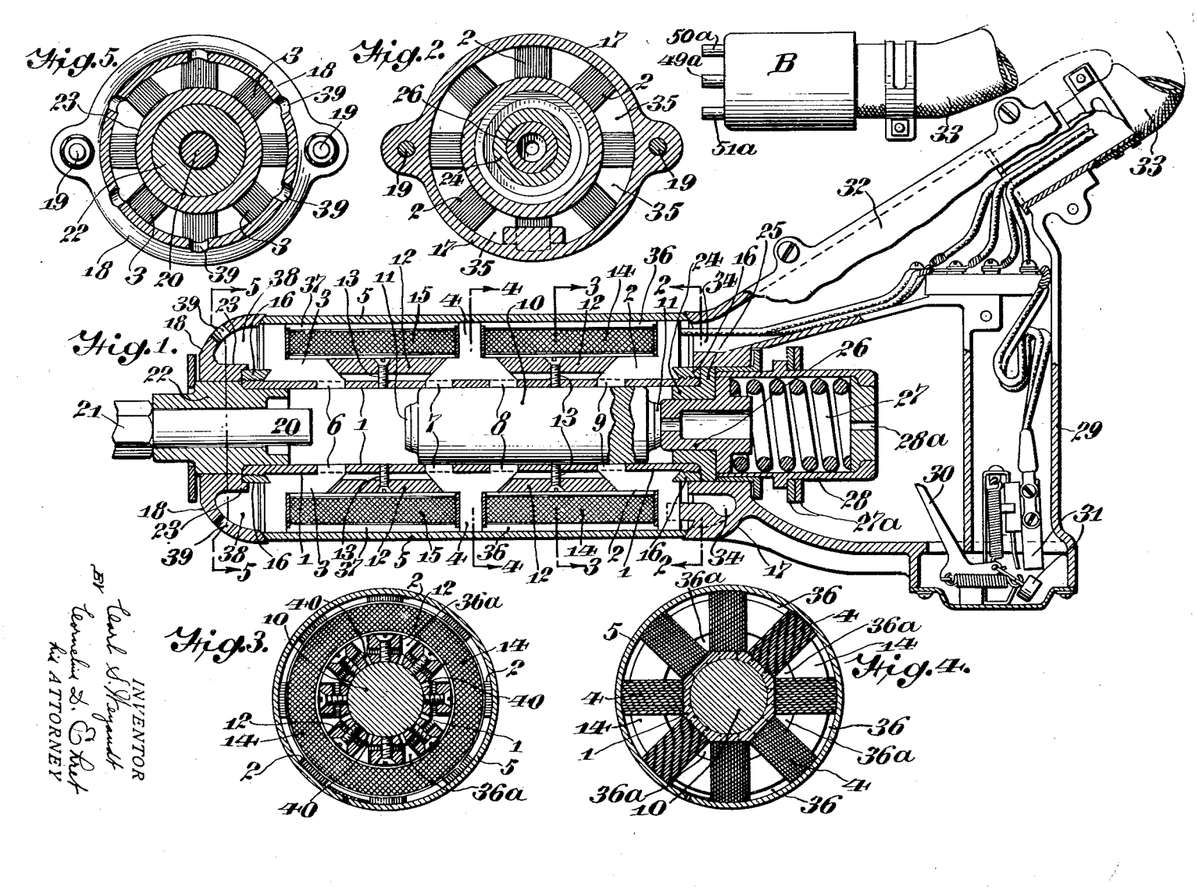
Fig. 1 is a longitudinal section, some parts in elevation, of a reciprocating electric motor embodying my invention.
Fig. 2 is a cross-sectional view, parts in elevation, taken on the line 2—2 of Fig. 1.
Fig. 3 is a cross-sectional view, parts in elevation, taken on the line 3—3 of Fig. 1.
Fig. 4 is a cross-sectional view, parts in elevation, taken on the line 4—4 of Fig. 1.
Fig. 5 is a cross-sectional view, parts in elevation, taken on the line 5—5 of Fig. 1.

Referring to the drawings, 1 is a barrel or a tubular guide member, of metal, such as brass or bronze, or light weight alloy such as any suitable alloy of aluminum. Disposed upon the exterior of the member 1, and abutting against its flat surfaces, are the circumferentially spaced groups of laminæ 2, 3 and 4, preferably of high silicon steel, having axially and radially extending portions, the latter abutting against or closely approaching the inner wall of the enclosing casing 5 of suitable magnetizable material such as silicon steel and substantially closed to the atmosphere. The axially extending portions of the laminæ have pole trips 6, 7, 8 and 9 extending through openings in the barrel 1. These pole tips are preferably hardened by any suitable process, such as case hardening, for a distance of about $\frac{3}{32}$ inch back from their inner edges where they are preferably ground flush with the inner surface of the barrel 1 which is also preferably simultaneously ground whereby there is provided an accurate bearing for the reciprocating core member 10 of magnetizable material having welded or otherwise attached thereto at its ends the members 11 of non-magnetic impact resisting material, such as stellite or equivalent.

The hardened pole tips provide a hard wearing surface which greatly increases the life of the motor or hammer sometimes to the order of threefold; and the extremely close approach to or direct contact with the core 10 materially increases the efficiency of the hammer, usually to the order of 30%.

The clamps 12, held to the barrel 1 by screws 13, at their beveled edges engage the beveled ends of axially neighboring groups of laminæ clamping them to the barrel 1. Surrounding the laminæ and their clamps are the solenoids or motor windings 14 and 15.

Threaded upon the opposite ends of the barrel 1 are the annular nuts 16 whose somewhat beveled ends engage the end groups of laminæ. The laminæ, the windings 14 and 15, and the barrel 1 constitute a structural unit which may be assembled as such prior to introduction into the casing 5 or before the assembly of the structure as a whole. Abutting against opposite ends of the casing 5 are the housings 17 and 18 constituting respectively the rear closure or handle member 17 and the front end closure member 18 which are drawn to each other by bolts 19, Figs. 2 and 5, thereby clamping the casing 5 and the magnetic field unit between them.

On its forward stroke the core 10 strikes the end or shank 20 of a tool fragmentarily indicated at 21. The shank 20 is disposed within a bushing 22 having a shoulder held against the left end of the barrel 1, Fig. 1, and centered within the hub or central bushing 23 of the closure member 18 which has a shoulder abutting against the nut 16.

Extending into the opposite end of the barrel 1 is the bushing 24 having the flange 25 abutting against the ends of the barrel 1 and nut 16. Disposed in the bushing 24 is the anvil or backstop member 26 resisted upon the back stroke of the core 10 by the spring 27, contained within the chamber 28, having air hole 28a, and by the spring plates 27a whose lateral ends are held by the bolts 19.

The end closure member 17 is provided with a transversely extending hand grip tubular member 29 adjacent which is the digitally controlled trigger 30 which controls the co-action of the switch elements 31. The member 17 has the inclined hollow portion 32 to whose free end is connected flexible air hose or conduit 33 through which extend the several conductors communicating with the switch 31 and with the windings 14, 15.

Air is delivered through the hose 33 through the interior of the member 32 to the annular or circumferentially extending chamber 34 in the member 17. The air proceeds from the chamber 34 through the spaces 35, Fig. 2, between the groups of laminæ 2, through the passages 36, between the winding 14 and the casing 5, thence through the spaces between the outer ends of the groups of laminæ 4, thence through the passages 37, between the winding 15 and the casing 5, thence through the spaces between the outer ends of the groups of laminæ 3, into the chamber or annular passage 38 within the end closure member 18, and thence to atmosphere through the ports 39.

Air is delivered also from chamber 34 through the spaces 35, Fig. 2, between the groups of laminæ 2, through the passages 36a, Figs. 4 and 3, between the winding 14 and the barrel 1, thence through the spaces between the groups of laminæ 4, thence through passages like passages 36a between the winding 15 and the barrel 1, thence through the spaces between the groups of laminæ 3 into the chamber 38, and thence to atmosphere.

There are air passages and currents of air therefore both outside of and inside or through the windings 14 and 15. Substantially none of the cooling air passes into or through the barrel or tubular member 1 in which may be disposed lubricating material for the core member 10 which bears on the hardened pole tips and upon barrel 1.

The barrel or tubular member 1 may be circumferentially closed throughout its length, though in such case there will be caused therein eddy current losses which may be reduced by utilizing for the member or barrel 1 a material having high specific resistance.

Figures 6, 7, 8:
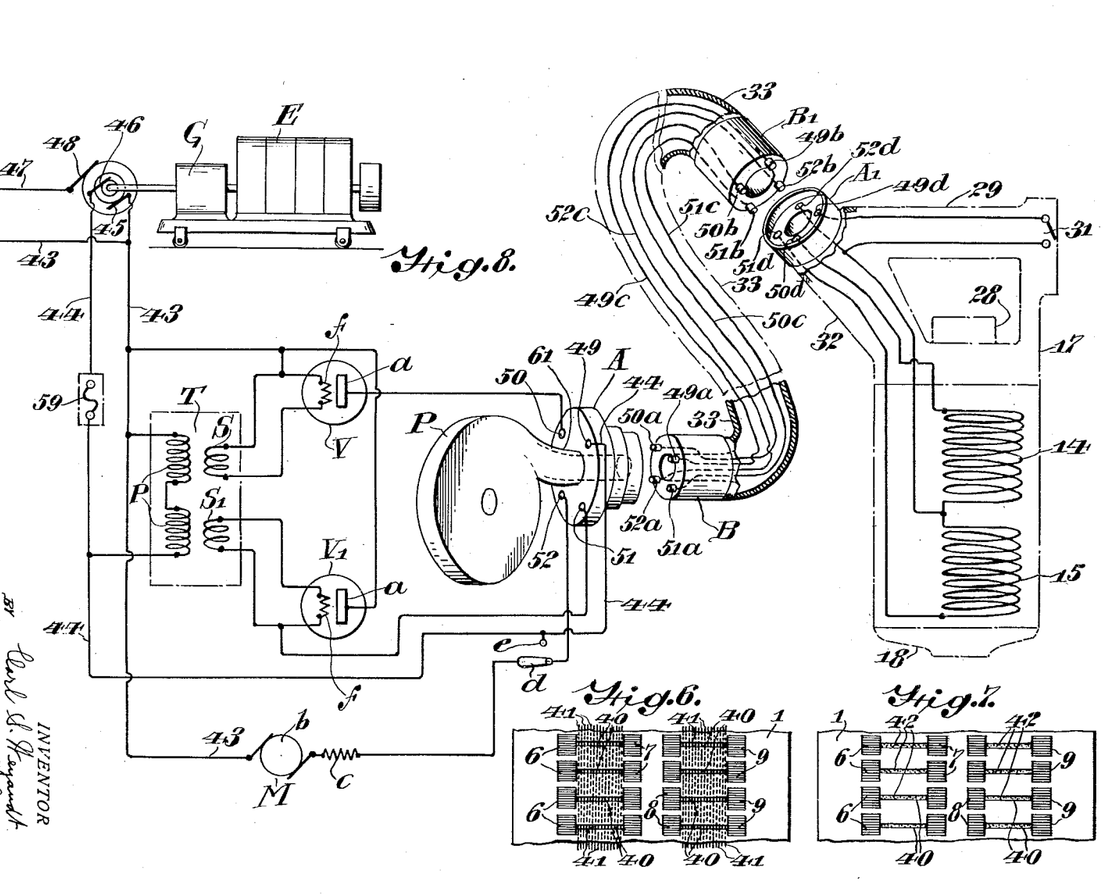
Figs. 6 and 7 are developed plan views of pole tips and slotted barrel.
Fig. 8 is a diagrammatic view of the electric and air control system.

Generally, and preferably, however, the barrel 1 will have between the pole tips 6 and 7, and again between the pole tips 8 and 9, longitudinally extending circumferentially spaced slots 40, Fig. 6, to reduce eddy current losses. These slots make possible the entry of cooling air into the barrel 1. However, this is prevented by wrapping the barrel circumferentially, on the exterior thereof, across the slots 40 with impregnated string 41, or with tape, fabric or equivalent material, thus isolating the interior of the barrel 1 from the air cooling passages whereby escape of lubricant from the barrel is prevented and whereby entry into the barrel of dust, grit or the like, carried by the cooling air, is prevented.

Or, as indicated in Fig. 7, the slots 40 may be filled with non-conducting material 42 of any suitable character, preferably one unaffected by lubricant in the barrel 1.

Referring to Fig. 8, conductors 43 and 44 represent generically any suitable source of alternating current of any suitable frequency, including the frequencies of ordinary lighting or power circuits of from about 25 to about 60 cycles per second.

In the example illustrated the source of power is the alternating current generator G, having a suitable field-exciting generator, driven by any suitable motor E such as an internal combustion engine, as indicated, or an electric or other motor, comprising with the generator G a portable power unit.

As indicated, the generator G may be of the two-phase type whose brushes 45 and 46 are connected to conductors 43 and 44. A system similar to that described herein may be operated by connection to the conductors 43 and 47 of the other phase, connecting respectively to the brushes 45 and 48.

V and V1 represent generically asymmetrical electrical conductors or electric valves. In the example illustrated they are of the thermionic type, each comprising an anode $a$ and a filament or cathode $f$.

A step-down transformer T has its primary winding P connected across the conductors 43 and 44 and its secondaries S and S1 connected in circuit with the cathodes $f$ which are rendered incandescent by the current traversing them.

The conductor 43 is connected to the cathode $f$ of the tube V and to the anode $a$ of the tube V1. The conductor 44 connects with the contact or terminal 49 of the air and electric socket A. The socket A is provided further with the contacts 50, 51 and 52. The anode $a$ of the tube V connects with the contact 50 and cathode $f$ of the tube V1 connects with the contact 51. The conductor 43 connects to one terminal of the rotary electric motor M comprising rotor or armature $b$ and field winding $c$, and the other terminal of the motor M connects to the double throw-switch $d$ for connecting, in the position indicated, the motor M to the contact 52 and in its other position through contact $e$ directly with the conductor 44. A plug B, on the hose 33, is adapted for attachment in the socket A by bayonet joint or equivalent means which locks it in predetermined relation to the socket. The plug B carries the contacts 49a, 50a, 51a and 52a which engage respectively the socket terminals 49, 50, 51 and 52. On the other end of the hose 33 is a plug B1 adapted to engage by bayonet joint or equivalent in the socket A1 secured upon housing or handle structure 17 of the reciprocating motor or hammer.

The plug contacts 49a, 50a, 51a and 52a connect, respectively, with the contacts 49b, 50b, 51b and 52b on the plug B1 through the conductors 49c, 50c, 51c and 52c extending through the hose 33. In the socket A1 are the contacts 49d, 50d, 51d and 52d engaged respectively by the contacts 49b, 50b, 51b and 52b. The contact 49d is connected to one terminal of the switch 31; the contact 50d connects with one terminal of the hammer winding 14; contact 51d connects with one terminal of the hammer winding 15; and the other terminals of the windings 14 and 15 connect with the other terminal of the switch 31 and with the contact 52d.

When the finger-operated trigger switch 31 is closed and when the conductor 43 is positive, current flows from that conductor from anode $a$ to cathode $f$ of the tube V1 and thence through contacts 51, 51a, conductor 51c, contact 51b, contact 51d, through hammer winding 15, thence through the switch 31 to contact 49d, contact 49b, conductor 49c, contacts 49a and 49 to conductor 44, energizing the coil 15 to cause a forward stroke of the core 10 to cause it to impact against the tool shank 20. With the switch 31 closed and the conductor 44 positive, current passes through contact 49, the intermediate contacts and conductors, through the switch 31, through the winding 40 to contact 40d and thence to contact 50 to anode $a$ of the tube V to its cathode $f$ to conductor 43, thereby energizing the winding 14 to cause a back-stroke of the core 10. The windings 14 and 15 are alternately energized to cause rapidly recurrent strokes of core 10 so long as switch 31 remains closed.

The motor M drives the air pump P which delivers air through the socket A, plug B, hose 33, plug B1, socket A1, and the air passages of the electric hammer or reciprocating motor as hereinbefore described.

With the switch $d$ in the position indicated the motor M is controlled by the trigger switch 31 upon the hammer or reciprocating motor and the switch 31 simultaneously controls delivery of current through the electric valves to the windings 14 and 15 as above described.

The motor M and pump P will continuously operate, independently of control by switch 31, when the switch $d$ is thrown onto contact $e$.

The pump P may be of any suitable character, but is preferably of the rotary or centrifugal type. It may compress atmospheric air and force it through the hose and the air passages of the reciprocating motor or hammer; or the socket A may connect to the suction end or port of the pump P, in which case air will be drawn from the atmosphere through the apertures 39, and thence through the air passages of the reciprocating motor or hammer through the hose and socket A to the intake of the pump P.

It is preferred, as indicated in Fig. 8, that the hammer or reciprocating motor be provided with an air and electric socket A1 adapted to receive the air and electric plug B1 on the hose. As indicated in Fig. 1, however, the hose 33 may be directly clamped or secured to the tube or conduit 32 and the electric conductors extending through the hose may connect directly to terminals disposed within the housing or handle structure 17.

The hose 33 may be of any suitable structure, but preferably is of the armored type. For example, it may comprise inner and outer layers of rubber-like material between which may be disposed a metallic armor or reinforcing structure.

The conductors 49c—52c may be imbedded in the wall of the hose 33 or, as indicated, extend freely through the hose passage. In either case, these conductors are longer than the hose or hose passage so that they shall not be placed under substantial tension either when the hose is twisted, bent or coiled or, and principally, when the hose stretches or increases in length, as it generally does after a period of use.

Figure 9:
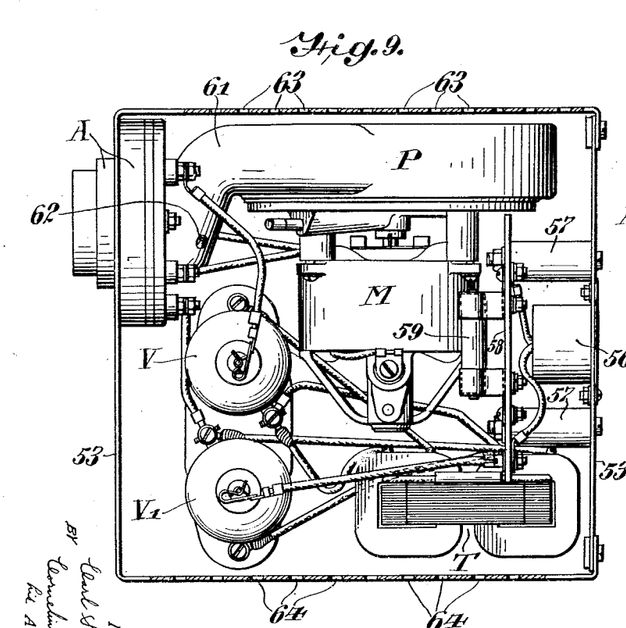
Fig. 9 is a top plan view of the control unit or box, with cover removed.
Figure 10:
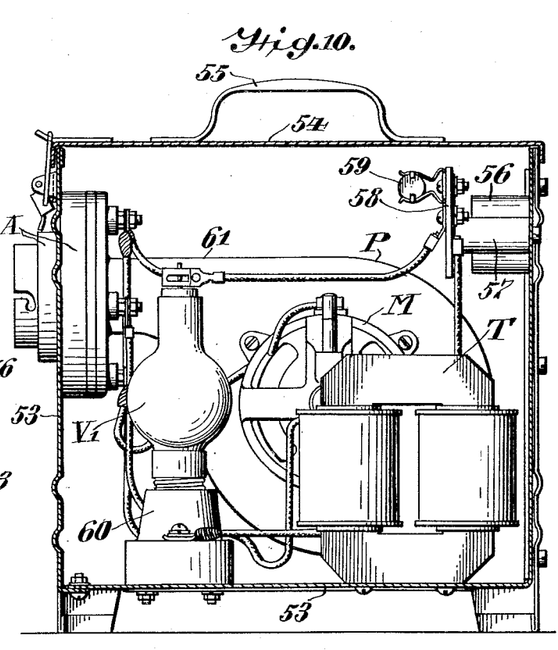
Fig. 10 is a vertical sectional view, parts in elevation, of the control box or unit.

While the valves V, V1, motor M, pump or blower P and transformer T, may be located wherever desired, it is preferred, as indicated in Figs. 9 and 10, that they be assembled in a portable unit within a control box 53 having a detachable cover 54 provided with a carrying handle 55.

To a side wall of the box 53 is secured a socket 56 into which is adapted to be inserted a plug to which the service wires 43 and 44 are connected. To the posts 57 is attached the plate of insulating material 58 upon which is mounted the fuse 59 through which all current is supplied to the transformer T, valves V, V1 and motor M.

Upon the bottom of the box 53 are secured the transformer T and the sockets 60 for the valves V and V1.

The socket A is mounted upon a side wall of the box, part disposed within and the remainder outside of the box.

The discharge passage or casing 61 of the pump P connects with the socket A and at any suitable point, as 62, is provided a hole for outlet of a portion of the air pumped into the interior of the box for cooling purposes. In a side of the box adjacent the intake of the pump P are provided apertures 63 for entry of air to the pump through any suitable air cleaning or screening structure, not shown. In another side wall may be provided apertures 64 to permit egress of the cooling air entering the box from the aperture 62. The valve structure V, V1 is disposed in the path of the air issuing from hole 62 and escaping through the apertures 64, and is cooled thereby. Some of the air issuing from the hole 62 passes in contact also with the motor M and transformer T, cooling them. The motor M is mounted on the side of the pump P or upon the bottom of the box 53, and has its armature shaft directly coupled to the rotor or impeller of the pump P.

Figure 11:
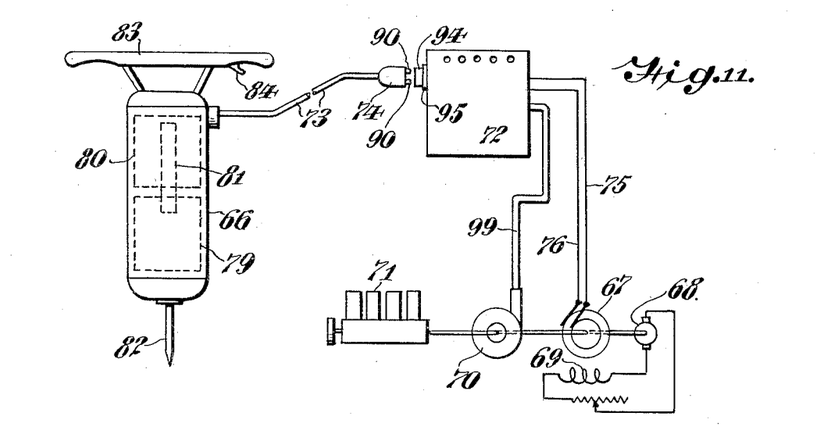
Fig. 11 illustrates a reciprocating motor system embodying my invention.

As illustrated in Fig. 11, a reciprocating motor system embodying my invention comprises a reciprocating motor or hammer unit 66 and a portable power plant including an alternating current generator 67, a small exciter generator 68 for exciting the field winding 69 of the generator 67, an air blower 70, a prime mover 71, which is illustrated for simplicity as an internal combustion engine, and a control box 72. The electric energy from the generator 67 and the air current from the blower 70 are supplied to the control box 72 containing apparatus for controlling the energization of the reciprocating motor 66. The electric energy and the current of air are transmitted from the control box 72 to the motor 66 through conducting means such as a cable 73 which is provided with a plug connector 74 to permit connection readily to be made to the apparatus within the control box 72.

Figures 12, 13, 14, 15:
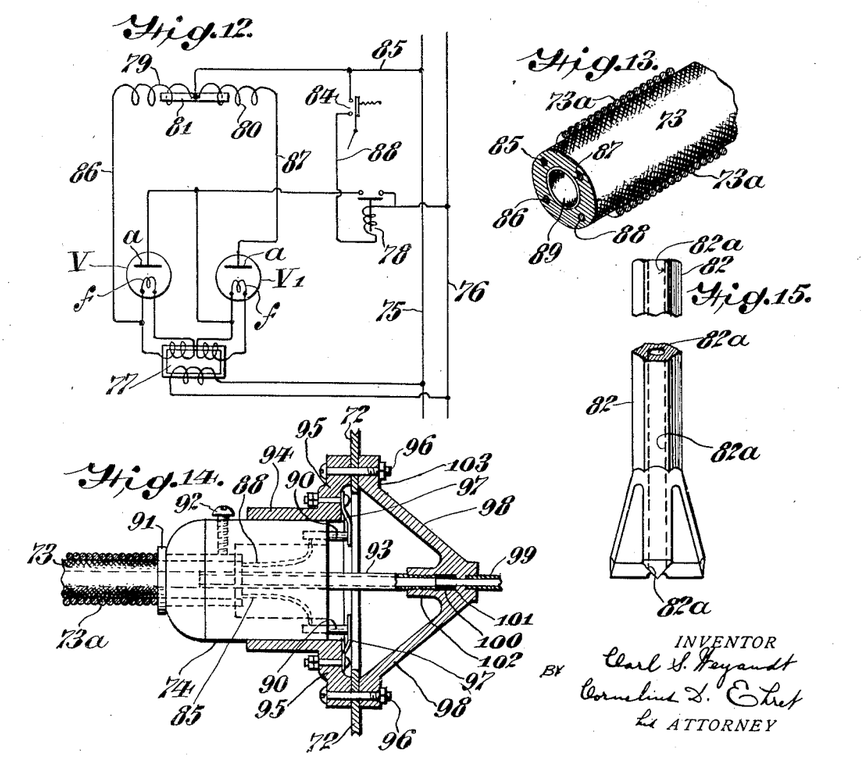
Fig. 12 is a diagram of a circuit arrangement utilized in controlling energization of the reciprocating motor.
Fig. 13 is a fragmentary perspective view of the cable effecting air and electric connections between the reciprocating motor and the generator and blower of the power plant.
Fig. 14 is a side elevational view, partly in section, of an air and electric cable or hose coupling.
Fig. 15 is a fragmentary elevational view of a hollow tool utilizable with the reciprocating motor.

Within the control box 72, as diagrammatically illustrated in Fig. 12, are two conductors 75 and 76 extending from the generator 67, a transformer 77, two electric valves V and V1 of the character hereinbefore described, and a relay switch 78.

The hammer unit or reciprocating motor comprises the two field or operating windings 79 and 80 alternately controlled by the valves V and V1 to effect synchronous reciprocating movement of the core member 81 to cause it periodically to impact against a tool 82 of construction and design suited to the type of work to be performed.

The motor 66 is provided with a handle 83 and a trigger switch 84 controlling delivery of current to the windings 79 and 80. The transformer 77 supplies current for heating the filaments $f$ of the valves V and V1 which comprise also the anodes $a$.

Closure of the switch 84 causes closure of the electromagnetic switch 78 in the control box 72 to connect the anode or plate of valve V and the filament of the valve V1 to the conductor 76. Since each of the windings 79 and 80 has one terminal connected to the conductor 75, they will be alternately energized through their controlling valves.

By means of the blower 70 a current of air is circulated through and around the windings 79 and 80 of the tamping unit or motor 66 sufficiently to prevent the development of excessive temperatures. The air may be discharged from the unit 66 through the bore 82a of the tool 82 to a point adjacent the tool tip to remove material such as that cut away or removed by the tool.

As illustrated in Fig. 13, the flexible rubber hose 73 has disposed within its wall four electrical conductors 85, 86, 87 and 88 for connecting the windings and switch of the unit 66 with the control apparatus in the box 72. The current of air from the blower 70 is transmitted through the central hose passage 89. The hose or cable 73 may be provided with an external helically wound armor 73a which may be strip metal or wire.

As illustrated in Fig. 14, the air-electric coupling or plug and socket arrangement includes the connector 74 which is provided with a plurality of terminal tips 90 to which the several hose conductors 85—88 are connected. The end of the cable or hose fits into an opening in the plug 74 and is tightly secured to the plug 74 by means of a clamping socket 91 and a set screw 92. One end portion of a substantially rigid tube 93 of metal or micarta is disposed as shown within the orifice of the hose 73 in such manner as to be tightly clamped therein by the clamping socket 91 and set screw 92.

A socket member 94 for receiving the plug 74 comprises a base 95 secured by bolts 96 upon the exterior of a wall of the control box 72 and upon which are supported several contact springs 97 engaged by the terminals 90 and insulated from each other and connected to the proper points of the circuit within the control box 72. Directly behind the contact springs and within the box 72 is disposed a socket member 98 arranged to receive the other end portion of tube 93 to permit a fairly tight connection for air transmitted from the blower 70 to the hose 73. The socket 98 comprises a tube 99 proceeding from the blower 70 to the box 72, a ring or gasket 100 of resilient material such as rubber, and a casing 101 disposed to enclose the ring and to support it. A guide 102 constitutes part of the casing 101 to guide the tube 93 so that it will abut against the resilient ring 100. The structure comprising the casing 101 and the ring 100 is supported directly behind the contact springs 97 by brackets 103 secured by the bolts 96.

By recourse to a structure of the reciprocating motor of the character indicated in Fig. 1 the air cooling is of enormous advantage in that the ratio of the weight of the reciprocating motor to its power or the work done upon the tool 21 is reduced to less than 50% while restricting the temperature rise to about 50° C. or less. This improved weight to power ratio is practically that of reciprocating motors or hammers operated by compressed air.

Air at relatively low pressure may be utilized. Pressure of the air as delivered to the tube or passage 32 of the reciprocating motor may be of the order of one pound per square inch, and is generally of the order of one-half pound per square inch or less. The cross section and length of the cooling medium passages within the reciprocating motor are such that at such pressures there is utilized one cubic foot of air (at atmospheric pressure) per minute for each 30 to 35 watts lost in the winding and field structure of the reciprocating motor.

When the tool operated by the reciprocating motor is a drill and it is desired to remove material from the hole by cooling air exhausted from the reciprocating motor, as may be the case in an arrangement of the character of Figs. 11 and 15, the pressure of air supplied to the reciprocating motor may be of the order of 5 to 15 pounds per square inch, depending upon the depth of hole and nature of material to be removed.

It shall be understood, however, that my invention is not limited to the foregoing proportions, pressures, ratios etc., since various features of my invention are new and useful without regard to such limitations.

What I claim is:

1. A reciprocating motor comprising a casing, circumferentially and axially spaced groups of field laminæ, a reciprocating core member, a field winding having within it an axially extending passage for cooling medium, and a housing on one end of said casing having a chamber communicating with said passage through the spaces between groups of laminæ.

2. A reciprocating motor comprising a casing, circumferentially and axially spaced groups of field laminæ, a reciprocating core member, a field winding having within it an axially extending passage for cooling medium and spaced from said casing to form a second passage for cooling medium, said passages adapted to conduct cooling medium in parallel therethrough, and a housing on one end of said casing affording fluid connections with said passages through the spaces between groups of laminæ.

3. A reciprocating motor comprising a tubular member, a core member reciprocating therein, circumferentially and axially spaced groups of field laminæ, a field winding surrounding and spaced from said tubular member to form a passage for cooling medium communicating with the spaces between groups of laminæ, and means for conducting cooling medium to said spaces between groups of laminæ.

4. A reciprocating motor comprising a tubular member, a core member reciprocating therein, circumferentially and axially spaced groups of field laminæ, a plurality of field windings separated by groups of laminæ and spaced from said tubular member to form passages for cooling medium in communication with each other through the spaces between said last named groups of laminæ, and means for conducting cooling medium in parallel through said passages.

5. A reciprocating motor comprising a tubular member, a core member therein, circumferentially and axially spaced groups of field laminæ, a casing, a plurality of windings separated by groups of laminæ and spaced from said casing and from said tubular member to form a plurality of parallel passages for cooling medium, and means for conducting cooling medium in parallel through said passages.

6. A reciprocating motor comprising a tubular member, a core member therein, circumferentially and axially spaced groups of field laminæ, a casing, a plurality of windings separated by groups of laminæ and spaced from said casing and from said tubular member to form passages for cooling medium, a housing rigidly mounted with respect to said casing having a chamber communicating with said passages, and means for conducting cooling medium to said chamber.

7. A reciprocating motor comprising a tubular member having slots, a core member reciprocating therein, circumferentially and axially spaced groups of field laminæ, a field winding surrounding and spaced from said tubular member to form a passage for cooling medium, non-conducting means closing communication between said passage and the interior of said tubular member through said slots, and means for conducting cooling medium to said passage.

8. A reciprocating motor comprising a tubular member, a core member reciprocating therein, circumferentially and axially spaced groups of field laminæ having poles extending through the wall of said tubular member, a field winding surrounding and spaced from said tubular member to form a passage for cooling medium, said tubular member having slots disposed between said poles, means for preventing communication through said slots between said passage and the interior of said tubular member, and means for conducting cooling medium to said passage.

9. A reciprocating motor comprising field members, a reciprocating core member, a casing, a field winding surrounding said core member and spaced therefrom and from said casing to form passages for cooling medium, a handle member rigidly secured with respect to said casing and having a chamber communicating with said passages, and a conduit for cooling medium attached to said handle member and communicating with said chamber.

10. A reciprocating motor comprising field members, a reciprocating core member, a casing, a field winding surrounding said core member and spaced therefrom and from said casing to form passages for cooling medium, a handle member rigidly secured with respect to said casing and having a chamber communicating with said passages, a conduit for cooling medium attached to said handle member and communicating with said chamber, and conductors extending through said conduit and connecting with said windings.

11. A reciprocating motor comprising a tubular member, field members having axially spaced poles extending through the wall of said tubular member, said poles having a greater degree of hardness than the remaining portions of said field members, a field winding, and a reciprocating core member within said tubular member bearing upon said hardened poles.

12. A reciprocating motor comprising a tubular member, longitudinally and axially spaced groups of field laminæ having hardened pole tips extending through the wall of said tubular member, and a reciprocating core member within said tubular member bearing upon said hardened pole tips.

13. In combination, a portable reciprocating motor comprising field members, a reciprocating core member, a field winding, structure for bringing cooling medium into heat-absorbing relation with respect to the motor parts, a pump remote from said motor for delivering cooling medium thereto, an electric motor for driving said pump, and a switch on said reciprocating motor for controlling supply of current to said field winding and to said pump-driving motor.

14. In combination, a portable reciprocating motor comprising field members, a reciprocating core member, a field winding, structure for bringing cooling medium into heat-absorbing relation with respect to the motor parts, a pump for cooling medium remote from said motor, a source of electric current, a control box, a connection from said control box to said reciprocating motor for delivering cooling medium thereto, and electrical connections from said control box to said field winding incorporated in said first-named connection.

15. In combination, a portable reciprocating motor comprising field members, a reciprocating core member, a field winding, structure for bringing cooling medium into heat-absorbing relation with respect to the motor parts, a source of current, a control box, a pump in said control box, a connection from said control box for delivering cooling medium to said reciprocating motor, an electric motor in said control box driving said pump, and electrical connections from said control box to said field winding incorporated in said first-named connection.

16. In combination, a portable reciprocating motor comprising field members, a reciprocating core member, a field winding, structure for bringing cooling medium into heat-absorbing relation with respect to the motor parts, a source of current, a control box, a pump in said control box, a connection from said control box for delivering cooling medium to said reciprocating motor, an electric motor in said control box driving said pump, electrical connections from said control box to said field winding, and a switch on said reciprocating motor controlling the circuit of said field winding and of said motor in the control box.

17. In combination, a portable reciprocating motor comprising field members, a reciprocating core member, a field winding, structure for bringing cooling medium into heat-absorbing relation with respect to the motor parts, a source of alternating current, a control box, electric valve structure in said control box, a pump for cooling medium in said control box, an electric motor for driving said pump, a connection for cooling medium from said control box to said reciprocating motor, and a switching mechanism on said reciprocating motor controlling delivery of current from said source to said field winding through said valve structure and controlling said pump-driving motor.

18. In combination, a portable reciprocating motor comprising field members, a reciprocating core member, a field winding, structure for bringing cooling medium into heat-absorbing relation with respect to the motor parts, a source of electric current, a control box, electric valve structure therein, a hose structure extending from said control box to said reciprocating motor, conductors in said hose connecting said valve structure and field winding in circuit with said source of current, and a pump delivering cooling medium through said hose to said reciprocating motor.

19. The combination with a manually portable electric tool and a relatively stationary source of electric energy therefor, of means for supplying a cooling medium to the tool, and circuit controlling means for rendering said cooling means effective to transmit the cooling medium to the tool so long as the tool is energized from said source of energy, said circuit controlling means adapted to simultaneously de-energize said tool and cooling means.

20. The combination with a percussive tool of the reciprocating motor type, a source of alternating current energy therefor and means associated therewith to control the transmission of energy to the tool, of means for supplying a cooling medium for the tool comprising an air blower, a flexible cable for transmitting the cooling medium and the electric energy to the tool, and a unitary connector associated with the cable for simultaneously effecting electrical connection between the tool and the control means, and also between the tool and the air blower.

21. A reciprocating motor comprising a field winding, individual groups of field members radially disposed with respect to a central tubular member, a reciprocating core member adapted to move within said tubular member, said groups of field members forming with the inner surface of said field winding a plurality of passages extending axially of said winding adapted to conduct a cooling medium therethrough, and means for conducting cooling medium to said passages.

22. A reciprocating motor comprising individual groups of field members radially disposed with respect to a tubular member, a reciprocating core member adapted to move within said tubular member, a field winding surrounding and spaced from said tubular member, means for securing individual groups of field members with respect to said tubular member, said securing means being axially aligned with and approximately equal in width to said groups for permitting unrestricted passage of a cooling medium between the inner surface of said field winding and the converging portions of said field members, and means for conducting cooling medium to said passages.

23. A reciprocating motor comprising individual groups of field members disposed radially with respect to a central tubular member, a field winding surrounding and spaced from said tubular member, said field members having poles extending axially of said winding, a plurality of clamping means for engaging and securing said poles with respect to said tubular member, said clamping means being comparatively narrow with respect to the circumference of said tubular member thereby permitting substantially unrestricted flow of a cooling medium through passages formed by the inner surface of said field winding and the converging portions of said field members, and means for conducting cooling medium to said passages.

24. A portable reciprocating motor comprising a tubular member, a core member reciprocating therein, a casing, field magnet structure disposed between said tubular member and said casing and comprising a field winding surrounding said member and spaced therefrom and from said casing to form passages for cooling medium, a housing rigidly secured to said casing at one end thereof having a chamber communicating with said passages, and means for conducting cooling medium directly to said chamber before admission of the same to said passages.

25. In apparatus of the character described, an element supported for reciprocatory movement, electro-magnetic means for imparting such movement to said element, electrical-supply connections for said electro-magnetic means, said apparatus provided with a passage providing for unidirectional flow of cooling fluid through said apparatus wherein such fluid flows into one end portion of said apparatus and is discharged from the other end portion of the same, means disposed exteriorly with respect to said apparatus and operable to induce such fluid-flow, and means providing an operating connection between said apparatus and said second-named means, said third-named means providing a protective casing for said electrical-supply connections.

26. In apparatus of the character described, an element supported for reciprocatory movement, electro-magnetic means for imparting such movement to said element, said apparatus provided with a passage providing for unidirectional flow of cooling fluid through said apparatus wherein such fluid flows into one end portion of said apparatus and is discharged from the other end portion of the same, and structure forming part of said apparatus and disposed at and constituting one of said end portions thereof and formed to provide a hand-grip for manual-manipulation of said apparatus, said structure provided with a passage forming part of the passage foresaid.

27. In apparatus of the character described, a primary electric motor, current-rectifying means for supplying said motor, and means common to said motor and said current-rectifying means and providing for cooling action with respect thereto, said second named means including an auxiliary driving motor.

28. The combination with a source of alternating current, of a principal motor, valve structure through which said motor is energized from said source, an auxiliary motor, and means operated thereby for cooling said valve structure and said principal motor.

29. The combination with a source of alternating current, of a portable motor, valve structure through which said motor is energized from said source, a separate unit comprising an auxiliary motor and means for impelling cooling medium driven by said auxiliary motor, and a connection for conducting cooling medium from said unit to said portable motor, said valve structure cooled by medium impelled by said means.

30. The combination with a source of alternating current, of a portable motor, valve structure through which said motor is energized from said source, a separate unit comprising an auxiliary motor and means for impelling cooling medium driven by said auxiliary motor, said valve structure included in said unit and cooled by medium impelled by said means, and connections extending from said valve structure to said portable motor.

31. The combination with a reciprocating motor, of valve structure, and a unit separate from said reciprocating motor comprising an alternating current generator supplying current through said valve structure to said reciprocating motor, means for impelling medium for cooling said valve structure, and a motor common to and driving said generator and impelling means.

CARL S. WEYANDT.